United States Patent
Henry

[11] 4,032,216
[45] June 28, 1977

[54] THIN FILM MAGNETO-OPTIC MODE CONVERTERS

[75] Inventor: Rodney D. Henry, Orange, Calif.

[73] Assignee: Rockwell International Corporation, El Segundo, Calif.

[22] Filed: Mar. 15, 1976

[21] Appl. No.: 667,237

[52] U.S. Cl. .......................... 350/96 WG; 350/151
[51] Int. Cl.² ........................................ G02B 5/14
[58] Field of Search ................ 350/96 WG, 151

[56] References Cited
OTHER PUBLICATIONS

Giess et al. "Magneto Optical Waveguide," IBM Tech. Disc. Bulletin, vol. 17, No. 9.
Tien "Integrated Optics," Scientific American, vol. 230, No. 4, Apr. 1974, pp. 28–35.
Henry "Thin–Film Optical Magnetic Mode Converters," App. Phys. Letts., vol. 26, No. 7, Apr. 1975, pp. 408–411.
Tien et al. "Switching & Modulation of Light in Magneto–Optic Waveguides of Garnet Films," App. Phys. Letts., vol. 21, No. 8, Oct. 1972, pp. 394–396.
Hepner et al. "Magneto–Optic Effects in Garnet & Thinfilm Waveguides," App. Optics, vol. 14, No. 7, July 1975, pp. 1479–1481.

Primary Examiner—John K. Corbin
Assistant Examiner—Stewart Levy
Attorney, Agent, or Firm—H. Fredrick Hamann; G. Donald Weber, Jr.; Robert Ochis

[57] ABSTRACT

Mode conversion of optical signals in thin film optical devices is obtained in a region of Faraday effect magnetic material waveguide by providing a periodic structure in which alternate half cycles have the magnetization parallel to the propagation direction to turn on the Faraday effect to induce mode conversion and in which the intervening half cycles have the magnetization perpendicular to the propagation direction to turn off the Faraday effect to prevent mode conversion. Stripe domains are preferably used to turn the Faraday effect off. Non-reciprocal mode conversion is obtained by optically coupling an anisotropic crystal to the waveguide to provide a quantity of mode conversion equal to that provided by the Faraday effect.

7 Claims, 2 Drawing Figures

THIN FILM MAGNETO-OPTIC MODE CONVERTERS

BACKGROUND OF THE INVENTION

1. Field of the Invention

The invention relates to the field of thin film optical mode converters.

2. Prior Art

Mode converters are desirable for use in integrated optics systems in order to couple different types of "devices" which operate with waves having different modes. In addition, non-reciprocal mode converters are desirable in order to form isolators, circulators and so forth.

The Faraday effect may be used to provide mode conversion in thin film optical waveguides. With most materials, once a beam of coherent light has been introduced into the waveguide, its makeup ($T_E$ and $T_M$ modes) will not change as the light wave propagates through the waveguide. However, in a magnetic material which displays the Faraday effect, mode conversion (the conversion of a $T_E$ mode to a $T_M$ mode or vice versa) can occur depending on the alignment of the magnetization of the material with respect to the light propagation direction. When the magnetization of the material is aligned parallel to the light propagation direction, the Faraday effect is at a maximum and will produce a maximum quantity of mode conversion per unit length for that material. When the magnetization of the material is aligned perpendicular to the direction of light propagation, the Faraday effect is at a minimum and no mode conversion is induced. When the magnetization of the material is aligned at an angle between 0° and 90° with respect to the direction of light propagation, an intermediate amount of mode conversion is provided, the amount decreasing as the angle increases from 0° toward 90°.

Reciprocal mode converters have been described in which the wave to be converted passes through a material exhibiting the Faraday effect. The magnetization in the Faraday material is made everywhere parallel to the direction of propagation, however, since the $T_E$ and $T_M$ waves have different phase velocities in the Faraday effect material, the direction of the magnetization is periodically reversed in order that mode conversion may accumulate. Such systems are difficult to produce in actual materials because of the difficulties in reversing the direction of the magnetization. Non-reciprocal mode converters have been described in which the $T_E$ and $T_M$ modes must both have the same phase velocity. In order for the $T_E$ and $T_M$ to have the same phase, a degenerate mode is required. The requirement for a degenerate mode can be expected to complicate the fabrication of devices and to limit the materials from which the device may be fabricated. In a first non-reciprocal mode converter, the wave is transmitted within an anisotropic waveguide which is disposed between a magnetic Faraday effect substrate and an anisotropic crystal. In a second non-reciprocal mode converter, the waveguide is magneto-optic and has an anisotropic crystal disposed thereover.

SUMMARY OF THE INVENTION

The invention obtains mode conversion through use of the Faraday effect. Mode conversion is produced by the Faraday effect and is accumulated by turning off the Faraday effect in those portions of the waveguide where the relative phases of the transverse electric wave ($T_E$ mode) and transverse magnetic wave ($T_M$ mode) would otherwise result in a reduction in the accumulated mode conversion via reconversion. The Faraday effect is turned off by providing a magnetization perpendicular to the direction of propagation in the area where the effect is to be turned off. In the areas where the magnetization is perpendicular to the direction of propagation, the region is preferably comprised of a plurality of stripe domains in order that the wave will pass through a succession of areas of reversed perpendicular magnetization in order that there will be no accumulation of any mode conversion which might result from the bounce angle of the radiation within the waveguide.

Non-reciprocal mode conversion is obtained by coupling a birefringent anisotropic crystal to the waveguide with the crystal matched to the waveguide to provide an amount of mode conversion equal to that provided by the waveguide. In consequence, when the wave propagates in the direction of the magnetic field in the "on" areas of the waveguide, the mode conversions induced by the Faraday effect and by the crystal add to produce substantially 100 percent mode conversion. When the wave propagates in the opposite direction to the magnetic field in the "on" areas of the waveguide, the mode conversion provided by the Faraday effect is equal in amount but opposite in direction to that provided by the anisotropic crystal, with the result that there is no net mode conversion.

DETAILED DESCRIPTION OF THE PREFERRED EMBODIMENT

Figure 1:
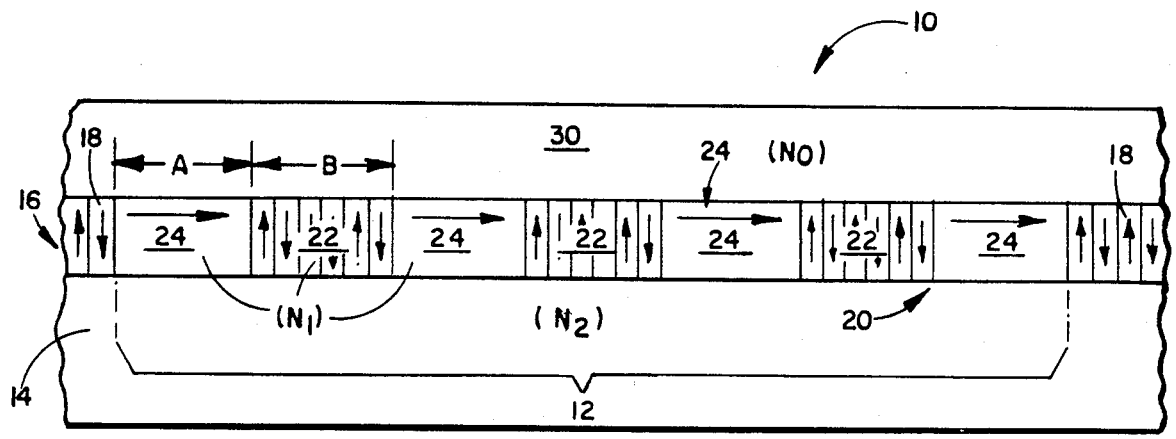
FIG. 1 is a schematic illustration of a longitudinal cross section through a reciprocal mode converter in accordance with the invention.

In accordance with the present invention, it is not necessary to produce a periodic reversal of the magnetization for reciprocal mode conversion or to match $T_E$ and $T_M$ phase velocities for non-reciprocal mode conversion as in the prior art devices. Rather, it is required that the mode conversion be turned on and off periodically.

In accordance with the invention, mode conversion is accumulated in a Faraday effect, magnetic thin film optical waveguide by periodically turning off the Faraday effect. Mode conversion is accumulated by appropriate placement of the portions of the magneto-optic waveguide in which the magnetization is parallel to the direction of propagation whereby the Faraday effect is in operation. These Faraday effect areas are chosen to have a length over which the $T_E$ and $T_M$ modes will be sufficiently in phase to provide mode conversion in a desired sense and are spaced apart an appropriate distance so that the mode accumulation achieved in one of the Faraday effect areas will add to the mode accumulation achieved in each of the other Faraday effect areas. The Faraday effect areas are separated from each other by non-Faraday effect areas in which the magnetization of the waveguide is perpendicular to the direction of propagation. This is preferably achieved by populating the non-Faraday effect areas with a plurality of stripe domains having their magnetization perpendicular to the plane of the waveguide, with contiguous stripe domains magnetized in opposite directions.

Stripe domains are preferred for turning off the Faraday effect for several reasons. First, such domains are easily produced in a controlled manner in thin magnetic films such as magnetic garnets. Second, stripe domain areas and Faraday effect areas are easily produced in a film of substantially constant composition and index of refraction. Initially, the waveguide may be formed with the mode conversion region fully populated with stripe domains (magnetization perpendicular to the plane) and then the positions of the waveguide which are to be Faraday effect areas are modified to make the magnetization parallel to the plane of the waveguide. Third, stripe domain films can be produced by methods well known in the magnetic bubble domain art and can be selectively converted to Faraday effect areas by techniques such as ion-implantation or diffusion which are also known in the magnetic bubble domain art. Fourth, a large number of narrow stripe domains of alternating magnetization can be provided between adjacent Faraday effect areas, the benefits of which will be discussed hereinafter.

Where in the magnetic waveguide there is a component of the magnetization parallel to the direction of propagation, the Faraday effect will result in mode conversion. In traversing a thin film optical waveguide, the light travels a path which bounces back and forth between the upper and lower surfaces of the waveguide. Consequently, if the non-Faraday effect areas had a uniform magnetization perpendicular to the plane of the waveguide, then the magnetization would have a component parallel to the actual propagation direction of the waveguided light. This component of the magnetization could result in a net accumulation of mode conversion in the non-Faraday effect areas. Such an accumulation of mode conversion can be detrimental in several ways. First, the direction of mode conversion can be reversed from the desired direction of mode conversion, in which event the overall length of the system required to provide a given amount of mode conversion is increased. Second, where it is important that only a specific quantity of mode conversion occur within a period of the conversion structure, even mode conversion accumulated in the desired direction of mode conversion can have a detrimental effect in that it changes the amount of mode conversion accumulated in a period of the converter structure.

Use of a large number of narrow stripe domains of alternating magnetization minimizes any possible adverse effects resulting from any parallelism between the actual light propagation direction and the magnetization by frequent reversal of the magnetization which thereby reverses the sense of any mode accumulation, whereby any net mode accumulation is minimized.

Since the magnetic structure, in accordance with the invention, is more easily produced than is 180° reversal of the field, the invention provides an improved manner of fabrication of reciprocal mode converters. That is, the Faraday effect areas may be made equal in phase length to the stripe domain areas whereby the non-Faraday effect areas correspond to the areas of reversed magnetization in prior art magnetization-reversal mode converters. The resulting structure requires about twice the length of the prior art structure in order to accumulate the same mode conversion. However, the ease and reliability of fabrication which is obtained by the invention more than compensates for the increased device length.

Non-reciprocal mode conversion can be obtained in accordance with the invention by placing a birefringent anisotropic crystal in optical contact with the waveguide. The coupling of the anisotropic crystal is selected such that the mode conversion produced in one period of the waveguide by the Faraday effect is equal to the mode conversion produced in the same period of the waveguide by the anisotropic crystal. Under such conditions, the mode conversion of the waveguide and the crystal will add when propagation is in the direction of the magnetic field within the waveguide to provide the total desired mode conversion. However, the mode conversion from the waveguide and the anisotropic crystal will cancel each other when the light propagates in a direction opposite to the direction of the magnetic field.

FIG. 1 illustrates generally at 10 an integrated optics waveguide including mode conversion portion 12 in accordance with the invention. Integrated optics waveguide 10 comprises a substrate 14 having an index of refraction $N_2$; a waveguide 16 having an index of refraction $N_1$ and an overlayer of 30 having an index of refraction $N_0$. Substrate 14 is preferably a monocrystalline garnet such as gadolinium gallium garnet. The portion of waveguide 16 included in mode converter 12 has been denominated 20 and is preferably a substituted iron garnet having sufficient uniaxial anisotropy to support stripe domains having their walls substantially perpendicular to the surface of substrate 14 on which waveguide 20 is disposed. Overlayer 30 may comprise a vacuum, air, or any other material with a small refractive index.

Where the waveguide characteristics are such that the $T_E$ and $T_M$ mode phase velocities differ significantly, mode conversion waveguide 20 comprises a plurality of stripe domain areas 22 interspersed with a plurality of Faraday effect areas 24. As illustrated in FIG. 1, each stripe domain area 22 comprises a plurality of stripe domains in which the magnetization is perpendicular to the plane of waveguide film 20. Adjacent stripe domains have opposing magnetization. The direction of magnetization within the Faraday effect areas 24 can be controlled by external magnetic fields. To obtain a maximum Faraday effect, the magnetization in Faraday effect areas 24 is oriented parallel to the direction of propagation. The length A of the Faraday effect areas 24 is selected to obtain a maximum accumulation of mode conversion within the Faraday effect area 24. The length B of the stripe domain portions 22 is selected to space the Faraday effect areas 24 so that the net mode conversion accumulated in each Faraday effect area is in the same sense. The number of Faraday effect areas is selected to provide the desired quantity of mode conversion.

While the lengths A and B will normally be selected to obtain a maximum mode accumulation, there are circumstances in which the lengths A and B will be changed to change the quantity of mode conversion. For instance, where A and B are selected to provide maximum mode conversion, N periods of the periodic structure will provide less than complete conversion while N+1 periods of the structure will provide more than complete mode conversion with a resultant reconversion which results overall in less than complete mode conversion. This circumstance can be avoided by adjusting the lengths A and B to provide substantially complete mode conversion in N+1 periods of the structure. Alternatively, if the objective of the mode converter is not total conversion, then the lengths A and B may be adjusted to provide the desired quantity of mode conversion in a whole number of periods of the mode converter structure.

The non-Faraday effect portions 22 of the mode converter waveguide 20 are necessary where the waveguide characteristics are such that the $T_E$ and $T_M$ modes of interest have differing phase velocities. As the relative phases of the $T_E$ and $T_M$ modes change, a point is reached at which the sense of the mode conversion changes. That is, where a $T_E$ mode has been converting to a $T_M$ mode, the relative phases of the $T_E$ and $T_M$ modes will reach a point at which the sense of the mode conversion would reverse and the $T_M$ mode would begin to reconvert back to a $T_E$ mode. The reconversion is prevented by making that portion of the waveguide in which the conversion would be in the undesired sense a non-Faraday effect area, whereby no conversion takes place. The sense of the mode conversion changes each time the relative phase of the $T_E$ and $T_M$ modes reaches an integral multiple of 180°. Consequently, if a length L of waveguide is required for 180° of relative phase to accumulate between $T_E$ and $T_M$ modes, then A and B are preferably each set equal to L to obtain maximum mode conversion in a minimum length of the waveguide. However, if desired, A need not equal B.

The areas 18 of the waveguide 16 which are outside the mode conversion region 12 are fabricated to prevent net mode conversion. This can be accomplished by providing magnetic stripe domain areas in the regions 18 or by forming the regions 18 of non-Faraday effect materials wherein there is no mode conversion independent of the direction of any existing magnetic fields. However, the use of stripe domain areas in the vicinity of mode converter 12 is preferred in order that abrupt changes in waveguide composition can be avoided.

The mode converter of FIG. 1 is reciprocal in the sense that if it is constructed to convert a pure $T_E$ wave at its input to a substantially pure $T_M$ wave at its output when the light travels in the direction of the magnetization in the Faraday effect areas 24, then a pure $T_M$ wave at the input will be converted into a substantially pure $T_E$ wave at the output when light propagates in a direction opposite to the magnetization of Faraday effect areas 24. Similarly, when light travels in the direction of magnetization in the Faraday effect areas 24, a pure $T_M$ wave at the input will be converted to a substantially pure $T_E$ wave at the output and when light propagates in the direction opposite to the magnetization in the Faraday effect areas 24 a pure $T_E$ wave at the input will be converted to a substantially pure $T_M$ wave at the output.

Figure 2:
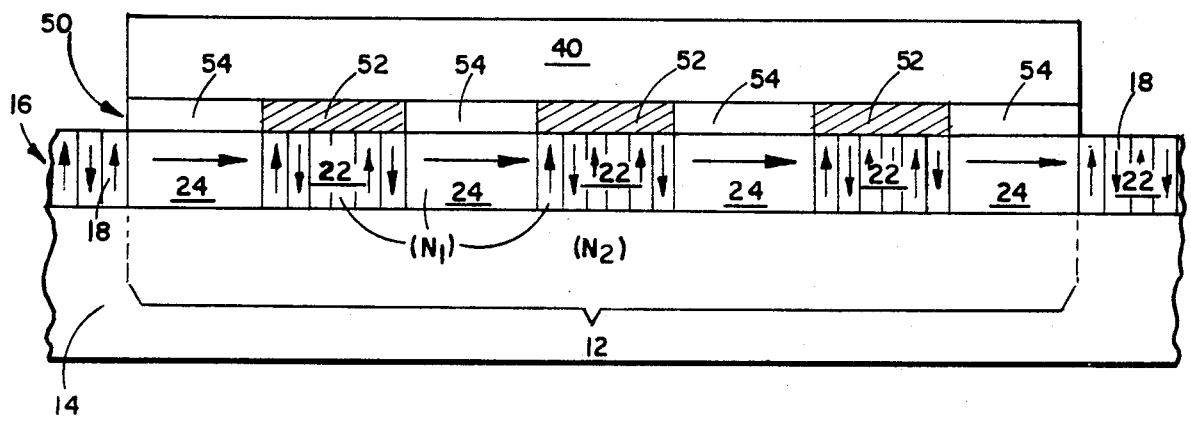
FIG. 2 is a schematic illustration of a longitudinal cross section through a non-reciprocal mode converter in accordance with the invention.

The reciprocal mode converter of FIG. 1 can be converted to a non-reciprocal mode converter by optically coupling an anisotropic crystal of the waveguide with an appropriate coupling coefficient. An illustrative embodiment of such a non-reciprocal mode converter is illustrated in FIG. 2. In FIG. 2, an anisotropic crystal 40 is coupled to the waveguide 20 by an optical coupling layer 50. Portions 54 of coupling layer 50 provide significant coupling of waveguide 20 to crystal 40 while the regions 52 produce minimal coupling between the waveguide 20 and the crystal 40. Ideally, portions 54 have an index of refraction identical to that of the waveguide and the regions 52 have a very small index of refraction. The anisotropic crystal 40 is coupled to the waveguide 20 in a manner which causes it to provide a quantity of mode conversion in each Faraday effect area of the waveguide structure which is equal to the mode conversion provided by the Faraday effect. In this manner, where the Faraday effect converts 50 percent of the $T_E$ mode to a $T_M$ mode, the anisotropic crystal will also convert 50 percent of the $T_E$ mode to a $T_M$ mode. Thus, when the light travels in the direction of the magnetization in the Faraday effect areas 24, there is essentially complete mode conversion of a $T_E$ input wave to a $T_M$ output wave. When light travels in the direction opposite the direction of magnetization in the Faraday effect areas, the sense of the mode conversion induced by the Faraday effect is reversed while the sense of the mode conversion induced by the anisotropic crystal remains unchanged. Thus, the mode conversion produced by the Faraday effect and the anisotropic crystal substantially cancel each other with the net result that light passing through the structure undergoes essentially no mode conversion. It will be noted that since crystal 40 is coupled to the waveguide only in the regions 54 overlying the Faraday effect areas 24, all of the mode conversion induced by the anisotropic crystal is induced in the Faraday effect portions of the waveguide 20. Consequently, in order for the crystal and the Faraday effect to produce equal amounts of mode conversion, the magnitude of mode conversion induced by the anisotropic crystal must be the same per unit length of the coupled portion of the anisotropic crystal as the magnitude of the mode conversion produced by the Faraday effect per unit length of the Faraday effect area. The quantity of mode conversion provided by the crystal can be varied by varying the alignment of the crystal axes with respect to the direction of light propagation.

The optically coupled portions of crystal 40 have been illustrated as coincident with the Faraday effect areas 24 since this is considered preferable. However, coincidence is not required so long as the desired conversion effects are obtained.

If the waveguide characteristics are such that the phase velocities of the $T_E$ and $T_M$ modes are the same, the non-Faraday effect areas may be omitted within the mode conversion region 12. However, it is still helpful to retain the stripe domain areas outside the mode conversion portion of the structure in order that any change in waveguide material may be made in a non-Faraday effect portion of the structure.

In many prior art magneto-optic mode converters, the path length within the magnetic waveguide portion of the structure between the input and output couplers must be properly controlled in order to obtain a predetermined mode conversion characteristic. The present invention alleviates such limitations by providing stripe domain areas outside the desired mode conversion region, with the result that accurate spacing of the input and output coupling structures is not needed.

While only reciprocal and non-reciprocal mode converters have been illustrated and discussed in detail, it will be clear to those skilled in the art that modulators, switches and other similar devices may be fabricated utilizing the techniques of this invention by providing appropriate controls for varying the magnetization (direction and or magnitude) in the Faraday effect areas to vary the mode conversion provided by the structure. The magnetization of the Faraday effect areas may be altered as by providing an electric-current-induced variation in the direction or magnitude of the local magnetic field to alter the direction and/or magnitude of the magnetization of the Faraday effect areas.

A new magneto-optic mode converter structure has been disclosed as has been a new method of preventing accumulation of mode conversion in magneto-optic waveguides. Those skilled in the art may be able to vary the details of the preferred embodiments without departing from the scope of the invention. Since the preferred embodiments are illustrative, rather than limitative, the protection afforded this invention is defined by the appended claims.

What is claimed is:

1. An optical mode converter comprising:
a substrate and;
a magneto-optical waveguide supported by said substrate and comprising a periodic structure comprised of alternate first and second areas, said first areas having the magnetization therein in the plane of the waveguide and substantially parallel to the direction of propagation and said second areas having the magnetization therein perpendicular to the direction of propagation.

2. A thin film waveguide comprising:
a substrate;
a thin film optical waveguide disposed on said substrate, at least a portion of the waveguide comprising magnetic material exhibiting the Faraday effect; and
at least a portion of the magnetic material supporting stripe domains having the magnetization therein substantially perpendicular to the plane of the waveguide to prevent Faraday effect modification of a wave propagating within said stripe domain portion.

3. An optical mode converter comprising:
a substrate; and
a magneto-optical waveguide supported by said substrate and comprising a periodic structure comprised of alternate first and second areas, said first areas subjecting a wave propagating therethrough to mode conversion through the Faraday effect, said second areas producing no Faraday effect induced mode conversion of a wave passing therethrough, and said first and second areas having lengths such that the mode conversions accumulated in successive first areas are in the same sense.

4. An optical mode converter comprising:
a substrate; and
a magneto-optical waveguide supported by said substrate and comprising a periodic structure comprised of alternate first and second areas, said first areas having the magnetization therein in the plane of the waveguide and substantially parallel to the direction of propagation and said second areas having the magnetization therein perpendicular to the direction of propagation, each second area comprising a plurality of stripe domains having the magnetization therein substantially perpendicular to the plane of the waveguide, each stripe domain having its magnetization opposed to that of any immediately adjacent stripe domain.

5. The mode converter recited in claim 4 further comprising an anisotropic crystal periodically optically coupled to the waveguide.

6. The mode converter recited in claim 5 wherein said mode converter includes a layer of optical coupling material disposed to optically couple the crystal to the Faraday effect areas.

7. The mode converter recited in claim 6 wherein said mode converter further comprises spacing material which is optically isolating disposed between said crystal and said stripe domain areas.

* * * * *